United States Patent
Hang et al.

(10) Patent No.: US 8,363,935 B2
(45) Date of Patent: Jan. 29, 2013

(54) IMAGE PROCESSING APPARATUS, IMAGE PROCESSING METHOD, AND COMPUTER READABLE MEDIUM STORING IMAGE PROCESSING PROGRAM

(75) Inventors: Fu Hang, Kanagawa (JP); Jun Enomoto, Kanagawa (JP); Takafumi Matsushita, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1036 days.

(21) Appl. No.: 12/294,973

(22) PCT Filed: Mar. 27, 2007

(86) PCT No.: PCT/JP2007/057351
§ 371 (c)(1), (2), (4) Date: Jan. 30, 2009

(87) PCT Pub. No.: WO2007/114411
PCT Pub. Date: Oct. 11, 2007

(65) Prior Publication Data
US 2009/0238454 A1 Sep. 24, 2009

(30) Foreign Application Priority Data

Mar. 31, 2006 (JP) .................................. 2006-099580

(51) Int. Cl.
*G06K 9/00* (2006.01)
(52) U.S. Cl. ...................................... 382/167; 382/162
(58) Field of Classification Search .................. None
See application file for complete search history.

(56) References Cited

U.S. PATENT DOCUMENTS 6,825,876 B1 * 11/2004 Easwar et al. ................ 348/234
7,590,284 B2 * 9/2009 Kakiuchi et al. .............. 382/167
(Continued)

FOREIGN PATENT DOCUMENTS

| JP | 07-013274 A | 1/1995 |
| JP | 2000-076427 A | 3/2000 |

(Continued)

OTHER PUBLICATIONS

International Search Report for corresponding Intern'l. Appl. No. PCT/JP2007/057351, mailed Jun. 19, 2007, 2 pages in English.

(Continued)

*Primary Examiner* — Li Liu
(74) *Attorney, Agent, or Firm* — Sughrue Mion, PLLC

(57) ABSTRACT

An image processing apparatus includes a red eye candidate detecting section, a gold eye candidate detecting section, and a red eye-gold eye-correcting section. Herein, the red eye candidate detecting section detects a red eye candidate, which is an area of a color included in a color range of a predetermined red color, from image by using a detecting threshold value differentiating a red eye from a gold eye. The gold eye candidate detecting section detects a gold eye, which is an area of a color included in a color range of a predetermined gold color that is not overlapped with a color range of the predetermined red color, from image by using the detecting threshold value. The red eye-gold eye-correcting section performs a predetermined red eye correcting process to a red eye candidate detected by a red eye candidate detecting section, and performs a predetermined gold eye correcting process, which is different from a predetermined red eye correcting process, to a gold eye candidate detected by a gold eye candidate detecting section.

9 Claims, 7 Drawing Sheets

U.S. PATENT DOCUMENTS

| | | | |
|---|---|---|---|
| 7,894,666 B2 * | 2/2011 | Mitarai et al. | 382/167 |
| 2003/0007687 A1 * | 1/2003 | Nesterov et al. | 382/167 |
| 2004/0070598 A1 * | 4/2004 | Enomoto | 345/732 |
| 2004/0114189 A1 * | 6/2004 | Kaku et al. | 358/3.26 |
| 2007/0140589 A1 * | 6/2007 | Umeda | 382/275 |

FOREIGN PATENT DOCUMENTS

| | | |
|---|---|---|
| JP | 2000-137788 A | 5/2000 |
| JP | 2001-069333 A | 3/2001 |
| JP | 2004-118319 A | 4/2004 |
| JP | 2004-145287 A | 5/2004 |
| JP | 2005-286830 A | 10/2005 |
| JP | 2006-040230 A | 2/2006 |
| JP | 2007-274527 A | 10/2007 |

OTHER PUBLICATIONS

JP Communication, dated Mar. 16, 2010, issued in corresponding JP Application No. 2006-099580, 2 pages in Japanese.

* cited by examiner

420

| BRIGHTNESS OF GOLDEN EYE | CONVERSION VALUE TO RED EYE | | |
|---|---|---|---|
| | R COMPONENT | G COMPONENT | B COMPONENT |
| BRIGHTNESS 4200 | +△△% | -××% | -○○% |
| BRIGHTNESS 4210 | +□□% | -▽▽% | -◇◇% |
| ⋮ | ⋮ | ⋮ | ⋮ |

FIG. 4

IMAGE PROCESSING APPARATUS, IMAGE PROCESSING METHOD, AND COMPUTER READABLE MEDIUM STORING IMAGE PROCESSING PROGRAM

TECHNICAL FIELD

The present invention relates to an image processing apparatus, an image processing method, and a computer readable medium storing an image processing program. Particularly, the present invention relates to an image processing apparatus, an image processing method, and a computer readable medium storing an image processing program for performing a gold eye correcting process to a gold eye.

BACKGROUND ART

In the case that a subject person is captured by using a flash lamp, there is the possibility that a red or gold pupil of the subject person would appear in an image; namely, a red-eye effect or gold-eye effect would be caused. Due to this fact, the captured subject person is not a well looking. Accordingly, a method for correcting such red-eye or the gold-eye to an original pupil color has been proposed in diverse ways. A method, has been disclosed, for example, in Japanese Patent Application Publication No. 2000-76427, such that a necessary area as the correcting object areas including a bloc color defective areas such as red eye areas is designated by user, then all pixels of the red-eye are corrected based on a color value determined by a hue, a color saturation, and a lightness of the necessary area designated by user. Furthermore, a method has been disclosed as, for example, in Japanese Patent Application Publication No. 2004-145287, such that a photographing information such as stroboscope information, Ev value, shutter speed, and lens diaphragm is added to an optically taken picture, and possibility that a red-eye effect is caused is decided by using the photographing information is performed, then the picture is served to the red-eye effect compensating processing only when there is the possibility the red-eye effect is caused.

Additionally, a method has been disclosed as, for example, in Japanese Patent Application Publication No. 2000-137788, such that a face candidate area considered to correspond to the face of the human is extracted from an image to be processed, the face candidate area is divided into a specific number of blocks, and then a feature value found for each block are collated with patterns for matching found by dividing the face area actually corresponding the face of the human in order to extract a face candidate area as a face area corresponding to the face of human. Furthermore, a method has been disclosed as, for example, in Japanese Patent Application Publication No. 2000-137788, such that when a color density of an area corresponding to a face of a human extracted from an image is equivalent to a predetermined threshold value, a body candidate area is extracted from image, then accuracy as a face area (a face candidate area is surely a face image.) is evaluated to each face candidate area by use of a density and a color saturation in the face or the body candidate area in order to extract a face candidate area as a face area corresponding to the face of human. Moreover, a method has been disclosed as, for example, in Japanese Patent Application Publication No. 2000-137788, such that plural face candidate area estimated to be equivalent to a face of human are extracted from image, and overlap degree is calculated for a pair of face candidate areas which overlap each other, then accuracy as a face area is evaluated based on the overlap degree in order to extract a face candidate area as a face area corresponding to the face of human.

DISCLOSURE OF THE INVENTION

Problems to be Solved by the Invention

In the above mentioned invention disclosed in Japanese Patent Application Publication No. 2000-76427, together with Japanese Patent Application Publication No. 2004-145287, a red eye correction is equally performed to both a red eye and a gold eye without judging a detected red eye candidate as the eye or the gold eye. In this case, accordingly, since a color of a gold eye portion performed by a red eye correcting process is not a natural color of eyes, there is possibility that user senses a discomfort at image performed by the above red eye correction when he or she saw the image.

Therefore, it is an object of the present invention to provide an image processing apparatus, an image processing method, and a computer readable medium storing an image processing program, which is capable of overcoming the above drawbacks. The above and other objects can be achieved by combinations described in the independent claims. The dependent claims define further advantageous and exemplary combinations of the present invention.

Means for Solving the Problems

According to the first aspect of the present invention, an image processing apparatus includes a red eye candidate detecting section, a gold eye candidate detecting section, and a red eye-gold eye-correcting section. Herein, the red eye candidate detecting section detects a red eye candidate, which is an area of a predetermined color included in a color range of red color, from image by using a detecting threshold value differentiating a red eye from a gold eye. The gold eye candidate detecting section detects a gold eye, which is an area of a color included in a predetermined color range of gold color that is not overlapped with a color range of the predetermined red color, from image by using the detecting threshold value. The red eye-gold eye-correcting section performs a predetermined red eye correcting process to a red eye candidate detected by a red eye candidate detecting section, and performs a predetermined gold eye correcting process, which is different from a predetermined red eye correcting process, to a gold eye candidate detected by a gold eye candidate detecting section.

Furthermore, a level of R component in proportion to a levels of G component and B component of a color range of the predetermined red color may be higher than of a color range of the predetermined gold color, or an average value of levels of R component, G component, and B component of a color range of the predetermined gold color is larger than that of a color range of the predetermined red color. Additionally, the image processing apparatus further includes a red eye-gold eye-separating section. Herein, the red eye-gold eye-separating section that judges whether a red eye candidate detected by a red eye candidate detecting section is a predetermined red eye or a predetermined gold eye by using a red eye separating threshold value of which level of R component in proportion to at least one of G component and B component is higher than a detecting threshold value.

Furthermore, a red eye-gold eye correcting section may include a red eye correcting section and a gold eye correcting section. Herein, the red eye correcting section performs a red eye correcting process to a red eye candidate judged by a red eye-gold eye-separating section as a red eye. The gold eye correcting section performs a gold eye correcting process to a red eye candidate judged by a red eye-gold eye-separating section as a gold eye. Furthermore, the image processing apparatus further includes a red eye-gold eye-separating section. Herein, the gold eye-red eye-separating section judges whether a red eye candidate detected by a red eye candidate detecting section is a predetermined red eye or a predetermined gold eye by using a gold eye separating threshold value which is higher than a level of G component or an average value of levels of R component, G component, and B component of the detecting threshold value. Furthermore, a red eye-gold eye correcting section may include a red eye correcting section and a gold eye correcting section. Herein, the red eye correcting section performs a red eye correcting process to a red eye candidate judged by a red eye-gold eye-separating section as a red eye. The gold eye correcting section performs a gold eye correcting process to a red eye candidate judged by a red eye-gold eye-separating section as a gold eye. Additionally, the image processing apparatus may further include a red eye-gold eye-separating section and a gold eye converting section. The red eye-gold eye-separating section judges the red eye-gold eye-separating section judges whether a red eye candidate detected by a red eye candidate detecting section is a predetermined red eye or a predetermined gold eye by using a red eye separating threshold value of which level of R component is higher than that of the detecting threshold value. The gold eye converting section converts a color of a red eye candidate, which was judged by a red eye-gold eye-separating section as a gold eye, into a color, which is judged by a red eye-gold eye-separating section as a red eye. The red eye-gold eye-correcting section may performs a red eye correcting process to a red eye candidate of which color was converted by a gold eye converting section.

Moreover, the red eye correcting section may equally perform a red eye correction to two red eye candidates. Of these, one is a red eye candidate which was judged as a red eye by the red eye-gold eye separating section, while the other is a red eye candidate of which color was converted by a gold eye converting section since the red eye candidate was judged as a gold eye by the red eye-gold eye separating section. Additionally, the image processing apparatus further includes a red eye-gold eye-separating section and a gold converting section. Herein, the red eye-gold eye-separating section judges whether a red eye candidate detected by a red eye candidate detecting section is a predetermined red eye or a predetermined gold eye by using a gold eye separating threshold value which is higher than a level of G component or an average value of level of R component, G component, and B component of the detecting threshold value. The gold eye converting section converts a color of a red eye candidate, which was judged by a red eye-gold eye-separating section as a gold eye, into a color, which is judged as a red eye by a red eye-gold eye-separating section. The red eye-gold eye-correcting section may performs a red eye correcting process to a red eye candidate of which color was converted by a gold eye converting section.

Moreover, the red eye correcting section may equally perform a red eye correction to two red eye candidates. Of these, one is a red eye candidate which was judged as a red eye by the red eye-gold eye separating section, while the other is a red eye candidate of which color was converted by a gold eye converting section since the red eye candidate was judged as a gold eye by the gold eye-red eye-separating section. Additionally, an image processing apparatus may further include an ideal red eye-converted value-storage section and a brightness acquiring section. Herein, the ideal red eye-converted value-storage section stores a conversion value of a color in accordance with a brightness of a red eye candidate which was judged as a gold eye by the red eye-gold eye separating section or the gold eye-red eye-separating section. The brightness acquiring section acquires a brightness of a red eye candidate which was judged as a gold eye by the red eye-gold eye separating section. The gold eye converting section may convert a color of the red eye candidate, which was judged as a gold eye by the red eye-gold eye separating section, into a color, which is judged as a red eye by the red eye-gold eye separating section by use of a conversion value of a color stored in the ideal red eye-converted value-storage section in accordance with a brightness acquired by a brightness acquiring section.

According to the second aspect of the present invention, an image processing method includes a step of detecting a red eye candidate, a step of detecting a gold eye candidate, a step of a red eye correcting process, and a step of correcting a red eye-gold eye correction. Herein, the step of detecting a red eye candidate detects a red eye candidate, which is an area of a color included in a color range of a predetermined red color, from image by using a detecting threshold value differentiating a red eye from a gold eye. The step of detecting a gold eye candidate detects a gold eye candidate, which is an area of a color included in a color range of a predetermined gold color that is not overlapped with a color range of the predetermined red color, from image by using the detecting threshold value. The step of a red eye-gold eye-correcting process performs a predetermined red eye correcting process to a red eye candidate detected in a red eye candidate detecting process, and performs a predetermined gold eye correcting process, which is different from a predetermined red eye correcting process, to a gold eye candidate detected by a gold eye candidate detecting section.

According to the third aspect of the present invention, a computer readable medium storing an image processing program for the image processing apparatus, which performs a red correcting process to a red candidate included in image, and performs a gold eye correcting process to a gold eye candidate included in image. The image processing program allows the image processing apparatus to functions as a red eye candidate detecting section, a gold eye candidate detecting section, and a red eye-gold eye-correcting section. Herein, the red eye candidate detecting section detects a red eye candidate, which is an area of a color included in a color range of a predetermined red color, from image by using a detecting threshold value differentiating a red eye from a gold eye. The gold eye candidate detecting section detects a gold eye, which is an area of a color included in a color range of a predetermined gold color that is not overlapped with a color range of the predetermined red color, from image by using the detecting threshold value. The red eye-gold eye-correcting section performs a predetermined red eye correcting process to a red eye candidate detected by a red eye candidate detecting section, and performs a predetermined gold eye correcting process, which is different from a predetermined red eye correcting process, to a gold eye candidate detected by a gold eye candidate detecting section.

The summary of the invention does not necessarily describe all necessary features of the present invention. The present invention may also be a sub-combination of the features described above.

Effect of the Invention

According to the present invention, a red eye and a gold eye included in image is detected. Thereby, a red eye correcting process can be performed to a red eye, and a gold eye correcting process can be performed to a gold eye.

BRIEF DESCRIPTION OF THE DRAWINGS

FIG. 4 is a diagram showing a data component of an ideal red eye-converted value-storage section 420.

BEST MODE FOR CARRYING OUT THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
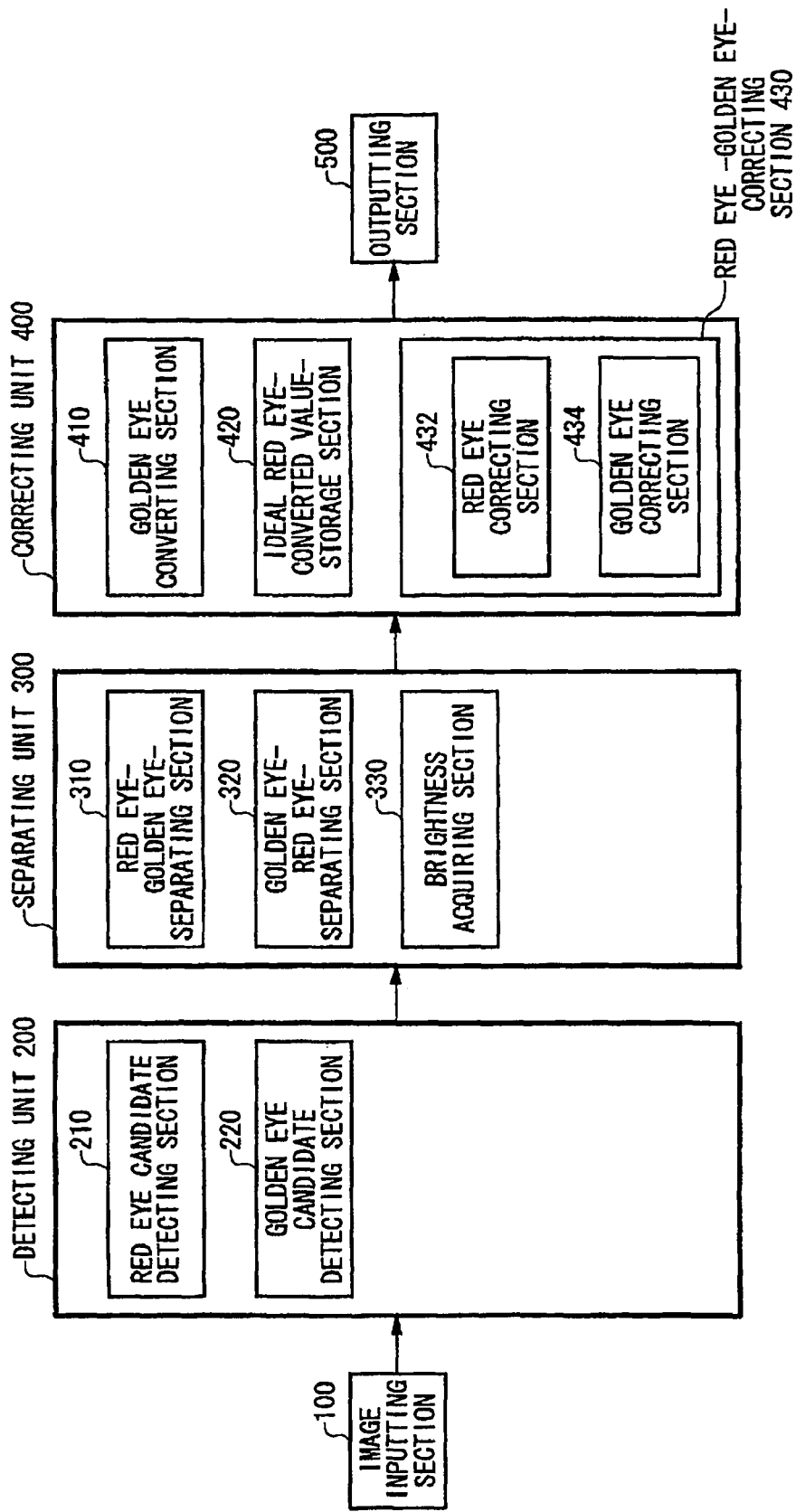
FIG. 1 is a block diagram showing a functional constitution of an image processing apparatus 10.

FIG. 1 shows one example of a functional constitution of an image processing apparatus 10 regarding one embodiment of the present invention. The image processing apparatus 10 includes an image inputting section 100, a detecting unit 200, a separating unit 300, a correcting unit 400, and an outputting unit 500. Herein, the detecting unit 200 includes a red eye candidate detecting section 210 and a red eye candidate detecting section 220. The separating unit 300 includes a red eye-gold eye-separating section 310, gold eye-a red eye-separating section 320, and a brightness acquiring section 330. The correcting unit 400 includes a red eye converting section 410, an ideal red eye-converted value-storage section 420, and a red eye-gold eye correcting section 430. The red eye-gold eye correcting section 430 includes a red eye correcting section 432 and a gold eye correcting section 434. The image processing apparatus 10 regarding the present embodiment has a purpose of detecting a red eye and a gold eye included in image, and performing a red eye correction process and a gold correcting process to a detected red eye and a gold eye.

Image are inputted to the image inputting section 100 from outside. The image inputting section 100 reads image printed on pictures, a paper medium, and the like. Thus, image are inputted to the image inputting section 100 as image data from outside. Additionally, such image data may be inputted to the image inputting section 100 via a memory medium such as a semiconductor memory or a network such as LAN and internet. Then, the image inputting section 100 transmits inputted image data to the detecting unit 200.

The red eye candidate detecting section 210 provided in the detecting unit 200 detects a red eye candidate, which is an area of a color included in a color range of a predetermined red color, from image received from the image inputting section 100 by using a detecting threshold value differentiating a red eye from a gold eye. Herein, a level of R component in proportion to a level of G component and B component of a color range of the predetermined red color may be higher than of a color range of the predetermined gold color. Additionally, the red eye candidate detecting section 210 may set a color range of a red color by means of a machine leaning. Moreover, the red eye candidate detecting section 210 may search a red eye candidate from image by template matching of a red eye of a specified configuration and size having a predetermined color range.

Herein, the red eye candidate detecting section 210 may detect a red eye based on plural kinds of parameter when searching a red eye. The red eye candidate detecting section 110 may detect a red eye candidate by using a several kinds of a red eye template image which is used in red eye detection. For example, a first one is a number of different sizes of a red eye template image. A second one is a number of different configurations of a red eye template image. A third one is a number of different type of hue of a red eye template image. Further, the red eye candidate detecting section 110 may move a red eye template image in a predetermined pitch width on image. The red eye candidate detecting section 110 may have preliminarily information regarding a number of different pitch width and movement start position for the case that a red eye template image is moved on image. For example, the red eye candidate detecting section 110 may detect a red eye candidate from image by varying a parameter in series.

Specifically, the red eye candidate detecting section 210 try to detect a red eye candidate in such a manner of searching red eye in image by using a first parameter. In the case that the red eye candidate detecting section 110 could not detect a red eye candidate by using the first parameter, the red eye candidate detecting section 110 tries to detect a red eye candidate by switching the first parameter to a second parameter. For example, the red eye candidate detecting section 110 detects a red eye candidate by searching a red eye in such a manner of moving a searching position of a red eye lamp plate in a first pixel pitch on image. In the case that the red eye candidate detecting section 110 could not detect a red eye candidate in the first pixel pitch, the red eye candidate detecting section 110 detects a red eye candidate in such a manner of moving a red eye template image in a second pixel pitch which is different from the first pixel pitch. The red eye candidate detecting section 110 may remove a red eye template image by varying pixel pitch in series until a red eye candidate is detected. Herein, the red eye candidate detecting section 110 may use a pixel pitch such that a search position searched in the first pixel pitch is not overlapped with a pixel pitch such that a search position searched in the second pixel pitch.

Additionally, the red eye candidate detecting section 210 may judge whether or not a position of detected plural red eye candidates is included in a facial image. Specifically, the red eye candidate detecting section 210 detects whether or not a fiscal image exists around the periphery of a detected red eye candidate. For example, the red eye candidate detecting section 210 judges whether or not a red eye candidate is located on the area corresponding to eyes of a facial image based on a relationship between positions of outline of eyebrow, nose, mouth, ears, mustache, beard, and face and a position of a red eye candidate. Furthermore, the red eye candidate detecting section 210 may judge that an imaging object is a facial image by rotating the imaging object around the periphery of a detected red eye candidate in the case that the imaging object has a symmetrical shape. Furthermore, the red eye candidate detecting section 210 may judge whether or not a facial area extracted from the image is located on the area corresponding to eyes of a facial area extracted by the red eye candidate. Then, the red eye candidate detecting section 210 may select a red eye candidate in which a red eye correction is to be performed in the case that the red eye candidate detecting section 210 judges that such red eye candidate is located on eyes of a face. The red eye candidate detecting section 210 transmits information indicating a position of image of a detected red eye candidate and information indicating a color of a detected red eye candidate to the separating unit 300 in accordance with image.

The gold eye candidate detecting section 220 provided in the detecting unit 200 detects a gold eye, which is an area of a color included in a color range of a predetermined gold color that is not overlapped with a color range of the predetermined red color, from image by using the detecting threshold value used by the red eye candidate detecting section 210. An average value of level of R component, G component, and B component of a color range of the predetermined gold color may be larger than that of a color range of the predetermined red color. Furthermore, a level balance of R component, G component, and B component of a color range of the predetermined gold color is harmonized in comparison with that of a color range of the predetermined red color. Additionally, the red eye candidate detecting section 210 may set a color range of a red color by means of a machine leaning. Moreover, the red eye candidate detecting section 210 may search a red eye candidate from image by template matching of a red eye of a specified configuration and size having a predetermined color range.

Herein, similar to the case of the above mentioned red eye candidate detecting section 210, the red eye candidate detecting section 220 may detect a gold eye based on plural kinds of parameter when searching a gold eye. For example, similar to the case of the red eye candidate detecting section 210, the red eye candidate detecting section 220 tries to detect a gold eye candidate by searching a gold eye in the image by using a first parameter. Then the red eye candidate detecting section 220 may try to detect a gold eye candidate by searching a gold eye in the image by using a second parameter, which is different from the first parameter. Additionally, similar to the case of the above mentioned red eye candidate detecting section 210, the red eye candidate detecting section 220 may judge whether or not a position of detected plural red gold eye candidates are included in a facial image. Specifically, the red eye candidate detecting section 220 may judge whether or not a detected gold eye candidate is located on the area corresponding to eyes of a facial image by judging whether or not the facial image is located around the periphery of a detected red eye candidate. Furthermore, the red eye candidate detecting section 220 may judge whether or not a facial area extracted from the image is located on the area corresponding to eyes of a facial area extracted by the red eye candidate. The red eye candidate detecting section 220 transmits information indicating a position of the image of detected gold eye candidate, and information indicating a color of a detected gold eye candidate in accordance with the image.

A red eye-gold eye-separating section 310 provided in the separating unit 300 judges whether a red eye candidate detected by a red eye candidate detecting section is a predetermined red eye or a predetermined gold eye by using a red eye separating threshold value of which level of R component in proportion to at least one of G component and B component is higher than a detecting threshold value provided in the red eye candidate detecting section 210. The red eye-gold eye separating section 310 may judge whether a red eye candidate detected by the red eye candidate detecting section 210 is a predetermined red eye or gold eye by using a red eye-separating threshold value of which level of R component is higher than that of the detecting threshold value provided in the red eye candidate detecting section 210. After the red eye-gold eye separating section 310 judged whether a red eye candidate detected by the red eye candidate detecting section 210 is a red eye or a gold eye, the red eye-gold eye separating section 310 transmits a judged result to the correcting unit 400.

Furthermore, the red eye-gold eye separating section 310 may judge whether a red eye candidate detected by a red eye candidate detecting section 210 is a red eye or a gold eye based on at least one of a first feature value, a second feature value, or a third feature value. Herein, the first feature value indicates a ratio of an average value of G component level in proportion to a sum total of an average vale of R component level, G component level, and B component level of pixels included in the red eye candidate detected by the red eye candidate detecting section 110. The second feature value indicates an average value of pixels of R component level included in the red eye candidate detected by the red eye candidate detecting section 210. The third feature value indicates a dispersion of R component level of pixels included in the red eye candidate detected by the red eye candidate detecting section 210.

More specifically, the red eye-gold eye separating section 310 may judge that a red eye candidate detected by a red eye candidate detecting section 210 is a gold eye in the case that the first feature value is greater than a predetermined first threshold value, and the second feature value is greater than a predetermined second threshold value. The red eye-gold eye separating section 310 may judge that a red eye candidate detected by a red eye candidate detecting section 210 is a gold eye in the case that the first feature value is smaller than a predetermined first threshold value, and the third feature value is smaller than a predetermined third threshold value. The red eye-gold eye separating section 210 may judge that a red eye candidate detected by a red eye candidate detecting section 210 is a red eye in the case that the first feature value is greater than a predetermined first threshold value, the second feature value is smaller than a predetermined second threshold value, and the third feature value is smaller than a predetermined third threshold value.

Additionally, the red eye-gold eye separating section 310 may judge that a red eye candidate detected by a red eye candidate detecting section 210 is a red eye in the case that the first feature value is smaller than a predetermined first threshold value, and the third feature value is greater than a predetermined third threshold value. Furthermore, the red eye-gold eye separating section 310 may judge that a red eye candidate detected by a red eye candidate detecting section 210 is a red eye in the case that the first feature value is greater than a predetermined first threshold value, the second feature value is smaller than a predetermined second threshold value, and the third feature value is greater than a predetermined third threshold value. The red eye-gold eye separating section 310 transmits a position in image of a red eye candidate judged as a gold eye to the gold eye converting section 410 and a brightness acquiring section 330 in accordance with a corresponding image. Furthermore, the red eye-gold eye separating section 310 transmits information indicating a position in image of a red eye candidate judged as a red eye to the red eye correcting section 430. What is more, the red eye-gold eye separating section 310 transmits information regarding an area of a red eye judged as a red eye or a gold eye, or brightness and a color of pixel in an area of a gold eye to the gold eye converting section 410 and the red eye correcting section 430.

A red eye-gold eye-separating section 320 provided in the separating unit 300 judges whether a red eye candidate detected by a gold eye candidate detecting section 220 is a predetermined gold eye or a predetermined red eye by using a gold separating threshold value of which level of G component, or an average value of level of R component, G component, and B component is higher than that of a detecting threshold value provided in the red eye candidate detecting section 210. After the red eye-gold eye separating section 320 judged whether a gold eye candidate detected by the gold eye candidate detecting section 220 is a gold eye or a re, eye, the red eye-gold eye separating section 320 transmits a judged result to the correcting unit 400. Furthermore, similar to the case of the red eye-gold eye-separating section 310, the gold eye-red eye separating section 320 may judge whether a red eye candidate detected by a red eye candidate detecting section 220 is a red eye or a gold eye based on at least one of a first feature value, a second feature value, or a third feature value. Herein, the first feature value indicates a ratio of an average value of G component level in proportion to a sum total of an average vale of R component level, G component level, and B component level of pixels included in the red eye candidate detected by the red eye candidate detecting section 220. The second feature value indicates an average value of pixels of R component level included in the red eye candidate detected by the red eye candidate detecting section 220. The third feature value indicates a dispersion of R component level of pixels included in the red eye candidate detected by the red eye candidate detecting section 220. Additionally, a result judged by the gold eye-red eye separating section 320 may includes information indicating whether a gold eye candidate is a gold eye or a red eye, together with information regarding a position on which the gold eye candidate is occupied on the image and a color of the red eye candidate. The brightness acquiring section 330 provided in the separating unit 300 acquires a brightness of the gold eye candidate judged as the gold eye judged by the red eye-gold eye-separating section 310. The brightness acquiring section 330 transmits information regarding acquired brightness to the correcting unit 400.

The ideal red eye-converted value-storage section 420 provided in the correcting unit 400 stores a conversion value of a color for converting a gold eye into a red eye in accordance with a brightness of a gold eye candidate which was judged as a gold eye by the red eye-gold eye separating section 310 or the gold eye-red eye separating section 320. The ideal red eye-converted value-storage section 160 may store a conversion value of a color in accordance with an average of brightness of pixel included in an area of a red eye candidate which was judged as a gold eye by the red eye-gold eye separating section 120. A conversion value of a color stored in the ideal red eye-converted value-storage section 160 may be a respective conversion value of R component level, G component level, and B component level. The ideal red eye-converted value-storage section 160 transmits information indicating a conversion value of a color to the gold eye converting section 140 based on a control of the gold eye converting section 140.

The gold eye converting section 410 provided in the correcting unit 400 converts a color of the red eye candidate, which was judged as a gold eye by the red eye-gold eye separating section 310, into a color, which is judged as a red eye by the red eye-gold eye separating section 310. The gold eye converting section 410 converts a color of the red eye candidate, which was judged as a gold eye by the red eye-gold eye separating section 320, into a color, which is judged as a red eye by the red eye-gold eye separating section 320 based on the above mentioned first feature value, second feature value, and third feature value, together with the above mentioned first separating threshold value, second separating threshold value, and third separating threshold value. The gold eye converting section 320 extracts a conversion value of a color stored in the ideal red eye-converted value-storage section 420 in accordance with a brightness acquired by the brightness acquiring section 330. The gold eye converting section 410 may extract a conversion value of a color stored in the ideal red eye-converted value-storage section 420 in accordance with a brightness which was appeared most frequently during a course of analyzing information indicating brightness received from the brightness acquiring section 150. The gold eye converting section 320 converts a color of the red eye candidate, which was judged as a gold eye by the red eye-gold eye separating section 320, into a color, which is judged as a red eye by the red eye-gold eye separating section 320 by using a conversion value of an extracted color. The gold eye converting section 410 transmits information regarding a position and a color of a red eye candidate, which was gained after a gold eye was converted into a red eye, to the red eye correcting section 430.

The red eye-gold eye correcting section 430 provided in the correcting unit 400 perform a predetermined red eye correcting process to a red eye candidate detected by the red eye candidate detecting section 210. The red eye-gold eye correcting section 430 performs a predetermined gold eye correcting process, which is different from a predetermined red eye correcting process performed to the red eye candidate, to a gold eye candidate detected by the gold eye candidate detecting section 220. The red eye-gold eye correcting section 430 may include a red eye correcting section 432 and a gold eye correcting section 434. The red eye correcting section 432 performs a red eye correcting process to a red eye candidate judged as a red eye by the red eye-gold eye separating section 310. The red eye correcting section 432 performs a red eye correcting process to a gold eye candidate judged as a red eye by the gold eye-red eye separating section 320.

On the other hand, the gold eye correcting section 434 performs a gold eye correcting process to a red eye candidate judged as a gold eye by the red eye-gold eye separating section 310. The gold eye correcting section 434 performs a gold eye correcting process to a gold eye candidate judged as a gold eye by the gold eye-red eye separating section 320. Furthermore, the red eye-gold eye correcting section 430 performs a red eye correcting process to a red eye candidate converted into a red eye by the red eye converting section 430 based on information received from the red eye converting section 410. The red eye correcting section 430 equally perform a red eye correction to two red eye candidates. Of these, one is a red eye candidate which was judged as a red eye by the red eye-gold eye separating section 320, while the other is a red eye candidate of which color was converted by a gold eye converting section 140 as the red eye candidate was judged as a gold eye by the red eye-gold eye separating section 320. the correcting unit 400 transmits image data performed by a red eye correcting process and a gold eye correcting process to the outputting section 500.

The outputting section 500 outputs image data. Herein, an image displaying apparatus such as monitor for displaying image data, a writing apparatus for writing image data to a recording medium such as DVD, and a communicating section for transmitting image data to other image processing apparatus are one example of the outputting section 150. Additionally, in the case that the outputting section 500 is a monitor, the outputting section 150 may display image data by converting a received image data into a visible image data.

The image processing apparatus 10 regarding an embodiment of the present invention can performs a red eye correcting process to a red eye candidate, and performs a god eye correcting process to a gold eye candidate by individually detecting a red eye candidate and a red eye candidate from image including a red eye and a gold eye. Accordingly, an appropriate correcting process can be performed to the red eye candidate and the red eye candidate, respectively so that a color of a gold eye portion performed by a red eye correcting process is a natural color of eyes. Consequently, this improvement can eliminate a possibility that user senses a discomfort at image performed by a red eye correction when he or she saw the image.

According to the image processing apparatus 10 regarding an embodiment of the present invention, after a red eye candidate included in the image is surely detected by using a predetermined detecting threshold value, a gold eye, which was not separated from a red eye, can be separated by using a red eye separating threshold value. Similarly, after a gold eye candidate included in the image is surely detected by using a predetermined detecting threshold value, a red eye, which was not separated from a gold eye, can be separated by using a gold eye separating threshold value. Thereby, a red eye correcting process is not performed to a gold eye included in a red eye, and a gold eye correcting process is not performed to a red eye included in a gold eye. Consequently, a color can be corrected with a high degree of accuracy in comparison with the case that a red correcting process is equally performed to a red eye and a gold eye.

Figure 2:
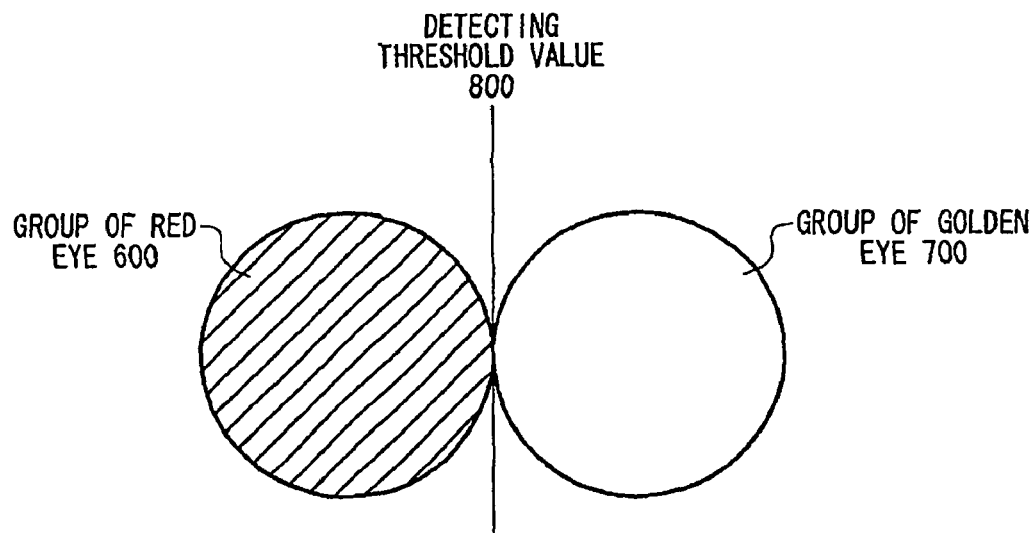
FIG. 2 is a diagram showing one example of a detecting threshold value

FIG. 2 is one example of a detecting threshold value 800 regarding one embodiment of the present invention. The red eye candidate detecting section 210 detects a red eye candidate, which is an area included in a predetermined color range of a red color, by using a detecting threshold value differentiating a red color from a gold color. The detecting threshold value 800 may be set as a value capable of accurately detecting a red eye candidate which should be corrected to a red eye. For example, a level of R component may be used as the detecting threshold value. This is because a red eye candidate should be accurately detected by using a level of R component as a detection of a red eye candidate more primarily than a level of G component and B component. Herein, a group of a red eye candidate detected from image by the red eye candidate detecting section 210 by using the detecting threshold value is defined as a group 6000f a red eye. On the other hand, the gold eye candidate detecting section 220 detects an area of a color included in a predetermined color range of a gold color that is not overlapped with a predetermined color range of the red color detected by as a red eye candidate by the red eye candidate detecting section 210. A group of a gold eye candidate detected from image by the gold eye candidate detecting section 220 as the gold eye candidate is defined as a group 600 of a red eye. The red eye candidate detecting section 210 and the gold eye candidate detecting section 220 can extract the group 600 of a red eye and the group 700 of a red eye by detecting the red eye candidate and the gold eye candidate included in the image by use of the detecting threshold 800.

Figure 3:
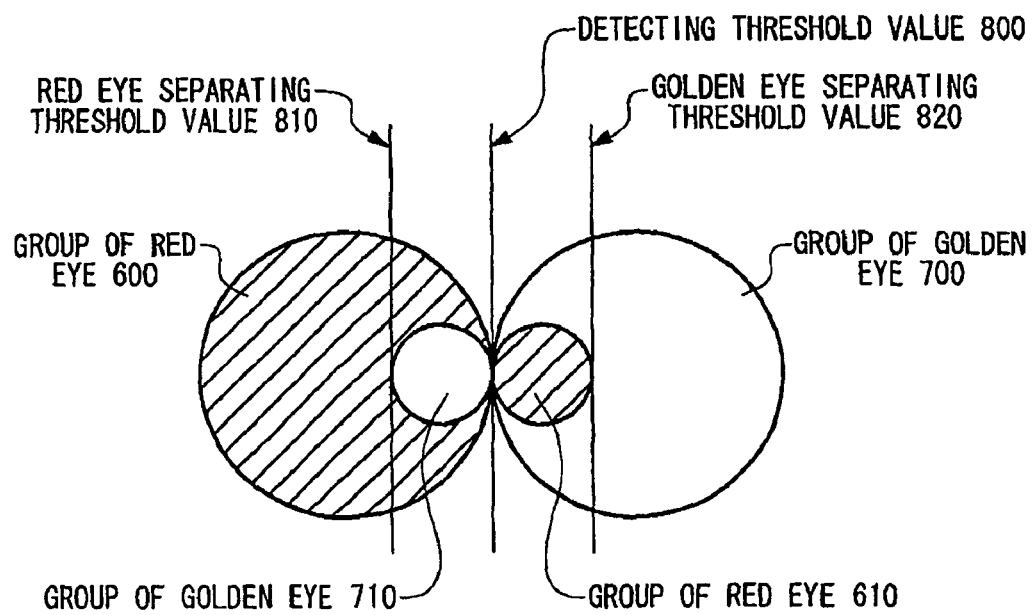
FIG. 3 is a diagram showing one example of a red eye separating threshold value 810 and a gold eye separating threshold value 820.

FIG. 3 is a diagram showing one example of a red eye separating threshold value 810 and a gold eye separating threshold value 820. The red eye candidate detecting section 210 extracts the group 600 of a red eye from the image by using a detecting threshed value 800. On the other hand, the gold eye candidate detecting section 220 extracts the group 700 of a gold eye from the image by using a detecting threshed value 800. Herein, the group 600 of a red eye extracted by the red eye candidate detecting section 210 includes the group 710 of a gold eye which could not be separated from the image by using a detecting threshed value 800. The group 700 of a gold eye extracted by the gold eye candidate detecting section 220 includes the group 610 of a red eye which could not be separated from the image by using a detecting threshed value 800. Then, the red eye-gold eye separating section 310 separates the group 710 of a gold eye from the group 600 of a red eye by using the red eye separating threshold value 810. On the other hand, the gold eye-red eye separating section 320 separates the group 610 of a red eye from the group 700 of a gold eye by using the gold eye separating threshold value 820.

The red eye-gold eye separating section 310 may separate the group 710 of a gold eye from the group 600 of a red eye based on at least one of a first feature value, a second feature value, or a third feature value. Herein, the first feature value indicates a ratio of an average value of G component level in proportion to a sum total of an average vale of R component level, G component level, and B component level of pixels included in the red eye candidate detected by the red eye candidate detecting section 110. The second feature value indicates an average value of pixels of R component level included in the red eye candidate detected by the red eye candidate detecting section 210. The third feature value indicates a dispersion of R component level of pixels included in the red eye candidate detected by the red eye candidate detecting section 210. Similarly, the gold eye-red eye separating section 320 may separate the group 610 of a red eye from the group 700 of a gold eye based on at least one of a first feature value, a second feature value, or a third feature value. Herein, the first feature value indicates a ratio of an average value of G component level in proportion to a sum total of an average vale of R component level, G component level, and B component level of pixels included in the red eye candidate detected by the red eye candidate detecting section 220. The second feature value indicates an average value of pixels of k component level included in the red eye candidate detected by the red eye candidate detecting section 220. The third feature value indicates a dispersion of R component level of pixels included in the red eye candidate detected by the red eye candidate detecting section 220.

The red eye-gold eye separating section 310 regarding an embodiment of the present invention can separate the group 710 of a gold eye, which could not separated from the image by using the detecting threshold value 800, from the group 600 of a red eye by using the gold eye separating threshold value 820. Similarly, the gold eye-red eye separating section 320 regarding an embodiment of the present invention can separate the group 610 of a red eye, which could not separated from the image by using the detecting threshold value 800, from the group 700 of a gold eye by using the gold eye separating threshold value 820. Specifically, after the red eye candidate and the gold eye candidate is surely detected by using the detecting threshold value 800, a gold eye can be separated from a red eye candidate, and a red eye can be separated from a gold eye candidate. Thereby, after the group 600 of a red eye and the group 700 of a gold eye are separated from the image, the group 710 of a gold eye is separated from the group 600 of a red eye by using the detecting threshold value 800, and the group 610 of a red eye is separated from the group 700 of a gold eye by using the detecting threshold value 800. Accordingly, in the process of the red eye-gold eye-separating section 310 and the gold eye-a red eye-separating section 320 which require an appropriate process, a speed of a separating process of a red eye and a gold eye can be improved in comparisons with the case of performing a process to all of a red eye candidate and a gold eye candidate included in the image.

FIG. 4 shows one example of a data component of an ideal red eye-converted value-storage section 420 regarding one embodiment of the present invention. The ideal red eye-converted value-storage section 420 stores a conversion value of a color for converting a gold color into a red color in accordance with a brightness of a red eye candidate which was judged as a gold eye by the gold eye-red eye separating section 320 or the red eye-gold eye separating section 320. For example, an ideal red eye-converted value-storage section 420 stores a variation of levels of R component, G component, and B component in accordance with brightness 4200. Herein, the variation of levels R component, G component, and B component is a variation required for converting a color of a gold eye having the brightness 4200 into a color judged as a red eye by the red eye-gold eye separating section 310. Similarly, the ideal red eye-converted value-storage section 420 stores a variation of levels of R component, G component, and B component in accordance with brightness 610. Herein, the variation of levels R component, G component, and B component is a variation required for converting a color of a gold eye having the brightness 610 into a color judged as a red eye by the red eye-gold eye separating section 310. The gold eye converting section 410 may converts a color of a gold eye into a predetermined color of a red eye based on a conversion value of a color stored in the ideal red eye-converted value-storage section 420. After a color of gold eye was converted into a color of red eye by the gold eye converting section 410, a red eye correcting process is performed to the gold eye by the red eye correcting section 430. Then, the gold eye is corrected to a color of eyes in which a red eye effect and a gold eye are not caused.

The ideal red eye-converted value-storage section 420 regarding an embodiment of the present invention stores a conversion value of a color for converting a color of a gold eye into a predetermined color of a red eye in accordance with brightness of a gold eye. The gold eye converting section 140 can convert a color of a gold eye into a color of a red eye in accordance with a conversion value of a color stored in the ideal red eye-converted value-storage section 420. Furthermore, after a gold eye was converted to a red eye, a red eye correcting process can be preformed to the gold eye by the red eye correcting section 430. As described above, unlike the case that an area of a gold eye portion is uniformly converted to a color of gold eye, a color of a gold eye can be converted to a color of a red eye under that condition that a gradation of areas of a gold eye portion is maintained. Under this condition, the red eye-gold eye-correcting section 430 performs a red eye correcting process to a gold eye, which was converted to a color of a red eye by the gold eye converting section 410. Consequently, a color of a gold can be corrected to a color of eyes showing a natural state.

Figure 5:
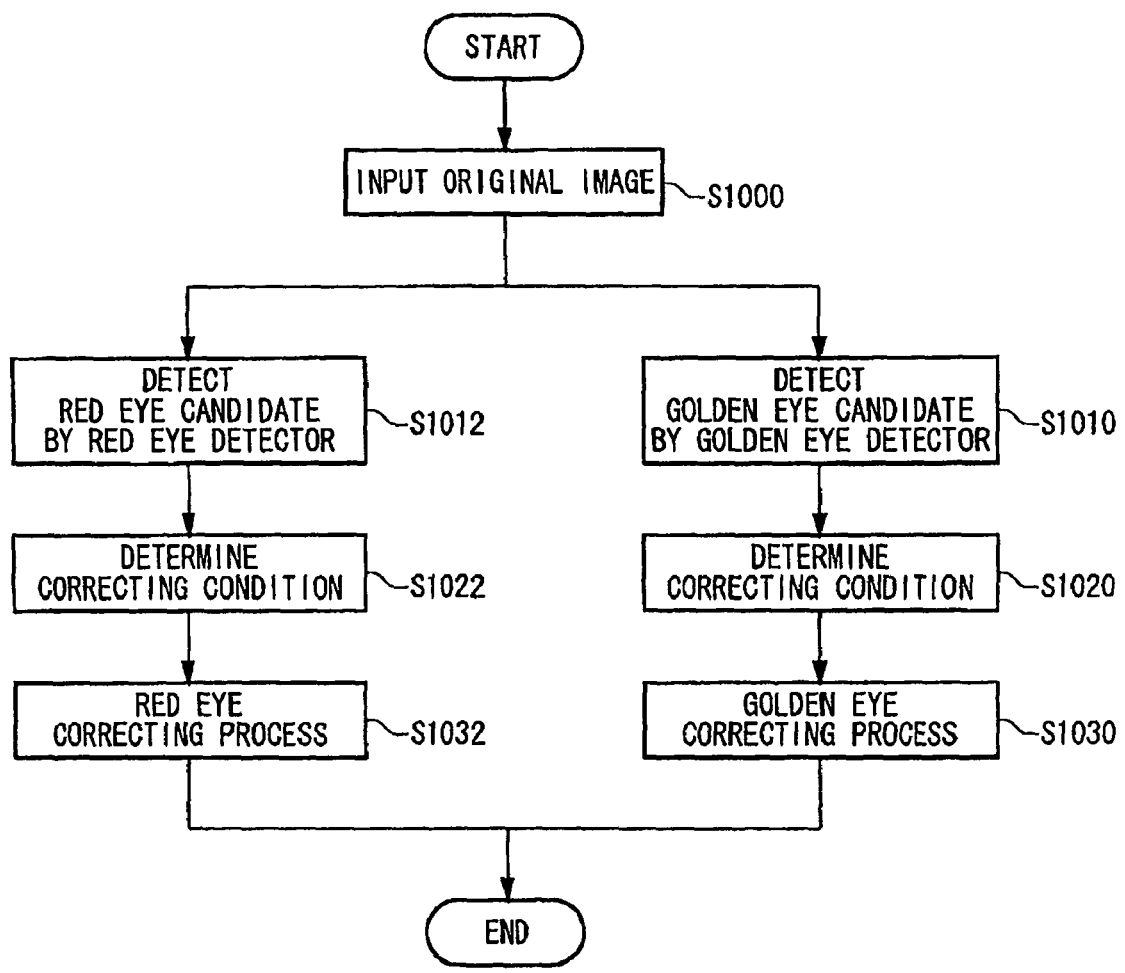
FIG. 5 is a process flowchart showing a process of an image processing apparatus 10.

FIG. 5 shows one example of a process flowchart in a process of an image processing apparatus 10 of an embodiment of the present invention. Firstly, an image inputting section 100 inputs original image to the image processing apparatus 10(S1000). Herein, the original image are one example of image inputted to the image processing apparatus 10. The image inputting section 100 transmits the inputted original image to the red eye candidate detecting section 220. The gold eye candidate detecting section 220 provided in the detecting unit 200 detect a gold eye candidate included in the original image (S1010). Herein, the red eye detecting section is one example of the red eye candidate detecting section 220. The red eye candidate detecting section 220 transmits information indicating a position of image of a red eye candidate detected by the original image and a color of a red eye candidate in accordance with image. The correcting unit 400 determines a correcting condition, which is required for performing a red eye correcting process to a gold eye based on information received from the red eye candidate detecting section 220(S1020).

Herein, the correcting unit 400 may includes the red eye-gold eye-correcting section 430. Furthermore, the red eye-gold eye-correcting section 430 may includes the gold eye correcting section 434. The gold eye correcting section 434 may determine a correcting condition required for performing a gold eye correcting process to a gold eye candidate (S1020). The gold eye correcting section 434 determines a variation of a level of R component, B component, and G component requiring for correcting a gold eye to a natural eye (for example, a black color), based on information received from the red eye candidate detecting section 220. Furthermore, the gold eye correcting section 434 determines a variation of color saturation and lightness requiring for correcting a gold eye to a natural color of eyes. The gold eye correcting section 434 performs a gold eye correcting process to a gold eye candidate (S1030). Herein, a gold eye correcting step is one example of a series of a gold eye correcting process which is performed to a gold eye candidate by the gold eye correcting section 434.

On the other hand, the red eye candidate detecting section 210 provided in the detecting unit 200 detects a red eye candidate included in the original image (S1012). Herein, the red eye detecting section is one example of the red eye candidate detecting section 210. the red eye candidate detecting section 210 transmits the red eye candidate detecting section 210 transmits information indicating a position of image of a red eye candidate detected from the original image and information indicating a color of a red eye candidate to the correcting unit 400 in accordance with image. the correcting unit 400 determines a correcting condition requiring for performing a red eye correcting process to a red eye candidate based on information received from the red eye candidate detecting section 210(S1022).

Herein, the red eye-gold eye-correcting section 430 may includes the gold eye correcting section 434. The red eye correcting section 434 may determine a correcting condition required for performing a gold eye correcting process to a gold eye candidate (S1022). For example, the red eye correcting section 432 determines a variation of a level of R component, B component, and G component requiring for correcting a gold eye to a natural eye (for example, a black color) based on information received from the red eye candidate detecting section 210. Furthermore, the gold eye correcting section 432 determines a variation of color saturation and lightness requiring for correcting a gold eye to a natural color of eyes. The gold eye correcting section 432 performs a gold eye correcting process to a gold eye candidate (S1032). Herein, a gold eye correcting step is one example of a series of a gold eye correcting process which is performed to a gold eye candidate by the gold eye correcting section 432.

Figure 6:
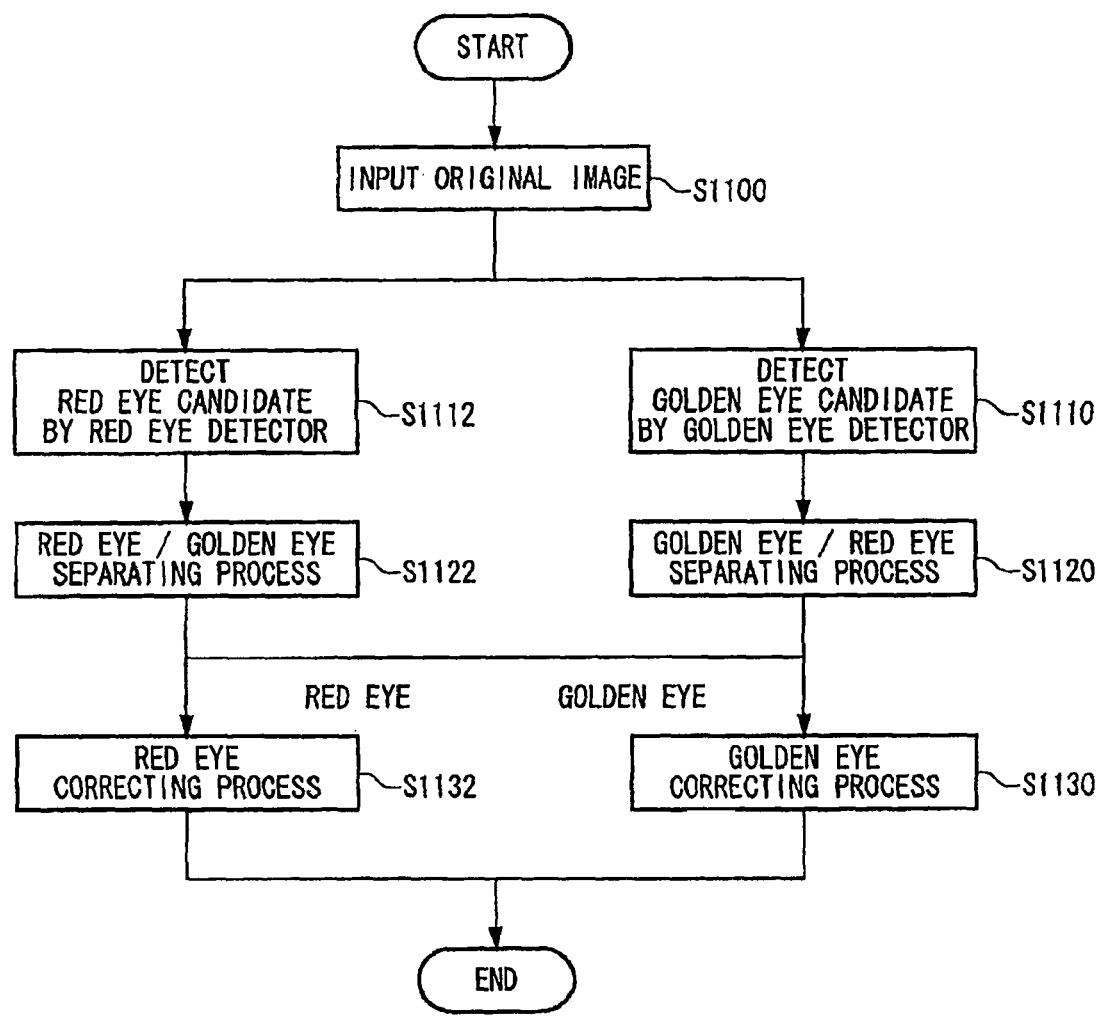
FIG. 6 is a process flowchart showing a process of an image processing apparatus 10.

FIG. 6 shows one example of a process flowchart in a process of an image processing apparatus 10 of an embodiment of the present invention. Firstly, an image inputting section 100 inputs original image to the image processing apparatus 10(S1100). The gold eye detecting section 220 provided in the detecting unit 200 detect a gold eye candidate included in the original image (S1110). The gold eye detecting section 220 transmits information indicating a position of image of a detected gold eye candidate and information indicating a color of a red eye candidate to the separating unit 300 in accordance with image. The gold eye-red eye separating section 320 provided in the separating unit divides a gold eye candidate into a gold eye and a red eye based on information received from the gold eye detecting section 220(S1120). The gold eye-red eye separating section 320 transmits information indicating a position of image of a red color separated from a red eye candidate and information indicating a color of a red color to the red eye correcting portion 432 included in the red eye-gold eye-correcting portion 430. Furthermore, the gold eye-red eye separating section 320 transmits information indicating a position of image of a red color separated from a red eye candidate and information indicating a color of a gold color to the gold eye correcting portion 434 included in the red eye-gold eye-correcting portion 430.

On the other hand, the red eye candidate detecting section 210 provided in the detecting unit 200 detects a red eye candidate included in the original image (S1112). the red eye candidate detecting section 210 transmits the red eye candidate detecting section 210 transmits information indicating a position of image of a red eye candidate detected from the original image and information indicating a color of a red eye candidate in accordance with image. The red eye-gold eye separating section 310 provided in the separating unit 300 divides a red eye candidate into a red eye and a gold eye based on information received from the red eye detecting section 220(S1122). The red eye-gold eye separating section 310 transmits information indicating a position of image of a red color separated from a red eye candidate and information indicating a color of a red color to the gold eye correcting portion 434 included in the red eye-gold eye-correcting portion 430. Furthermore, the gold eye-red eye separating section 310 transmits information indicating a position of image of a red color separated from a red eye candidate and information indicating a color of a gold color to the red eye correcting portion 432 included in the red eye-gold eye-correcting portion 430.

On the other hand, the gold eye correcting section 434 performs a gold eye correcting process to a gold eye candidate detected by the red eye-gold eye separating section 320 and a gold eye separated from a red eye candidate by the red eye-gold eye-separating section 310 based on information received from the gold eye-red eye-separating section 320 and the red eye-gold eye-separating section 310(S1130). Furthermore, the red eye correcting section 432 performs a red eye correcting process to a red eye candidate detected by the red eye-gold eye separating section 310 and a red eye separated from a gold eye candidate by the red eye-gold eye-separating section 320 based on information received from the gold eye-red eye-separating section 320 and the red eye-gold eye-separating section 310(S1132).

Figure 7:
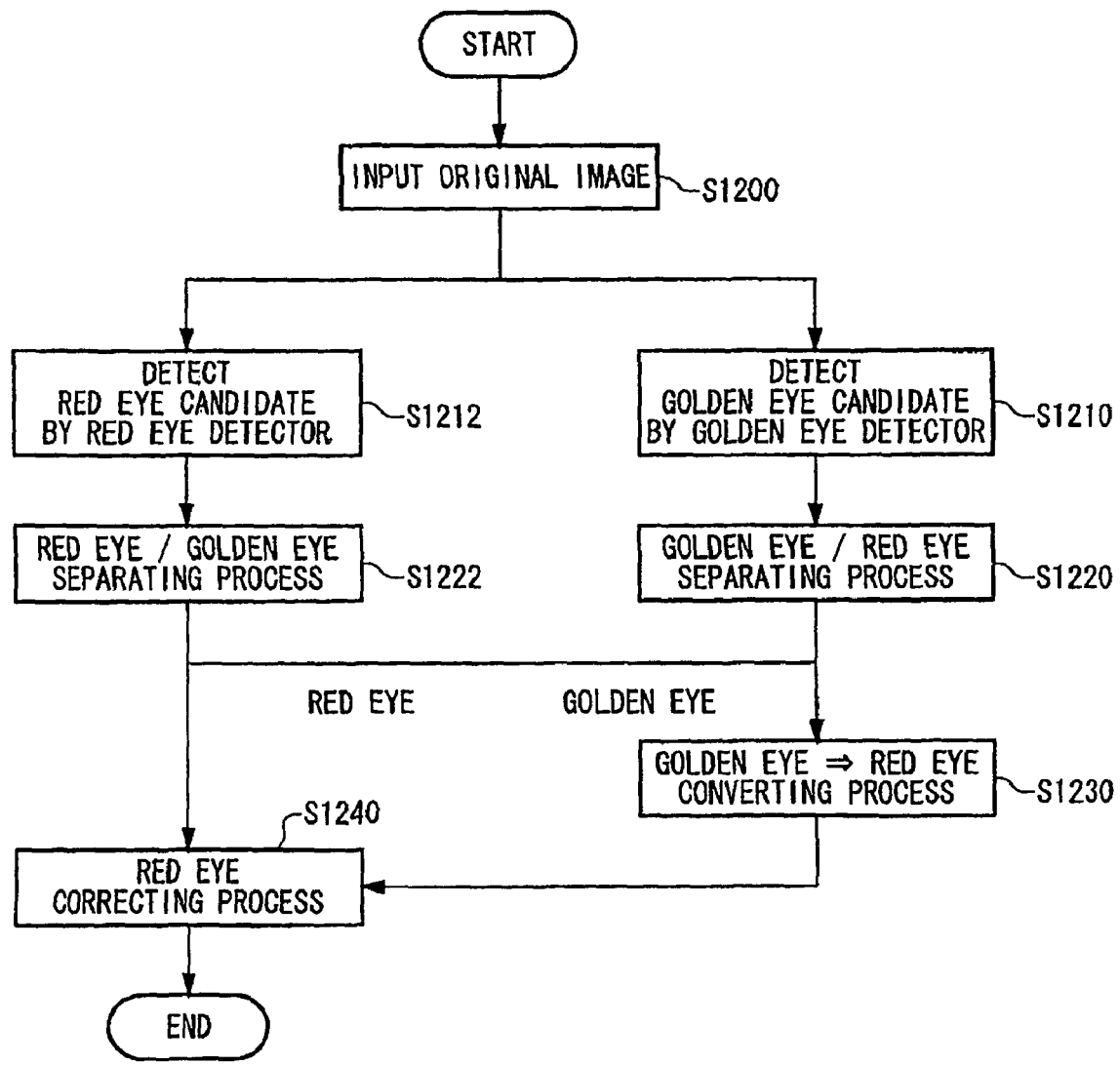
FIG. 7 is a process flowchart showing a process of an image processing apparatus 10.

FIG. 7 shows one example of a process flowchart in a process of an image processing apparatus 10 of an embodiment of the present invention. Firstly, an image inputting section 100 inputs original image to the image processing apparatus 10(S1200). The gold eye detecting section 200 provided in the detecting unit 200 detect a gold eye candidate included in the original image (S1210). The gold eye detecting section 220 transmits information indicating a position of image of a detected gold eye candidate and information indicating a color of a red eye candidate to the separating unit 300 in accordance with image. The gold eye-red eye separating section 300 provided in the separating unit divides a gold eye candidate into a gold eye and a red eye based on information received from the gold eye detecting section 220(S1220). The gold eye-red eye separating section 320 transmits information indicating a position of image of a red color separated from a red eye candidate and information indicating a color of a red color to the red eye correcting portion 432 included in the red eye-gold eye-correcting portion 430. Furthermore, the gold eye-red eye separating section 320 transmits information indicating a position of image of a red color separated from a red eye candidate and information indicating a color of a gold color to the gold eye correcting portion 434 included in the red eye-gold eye-correcting portion 410.

On the other hand, the red eye candidate detecting section 210 provided in the detecting unit 200 detects a red eye candidate included in the original image (S1212). The red eye candidate detecting section 310 transmits the red eye candidate detecting section 310 transmits information indicating a position of image of a red eye candidate detected from the original image and information indicating a color of a red eye candidate in accordance with image. The red eye-gold eye separating section 410 provided in the separating unit 300 divides a red eye candidate into a red eye and a gold eye based on information received from the red eye detecting section 220(S1222). The red eye-gold eye separating section 410 transmits information indicating a position of image of a red color separated from a red eye candidate and information indicating a color of a red color to the gold eye correcting portion 434 included in the red eye-gold eye-correcting portion 430. Furthermore, the gold eye-red eye separating section 310 transmits information indicating a position of image of a red color separated from a red eye candidate and information indicating a color of a gold color to the red eye correcting portion 432 included in the red eye-gold eye-correcting portion 430.

The gold eye converting section 410 converts a color of a gold eye candidate in which a red eye was separated, into a color, which is judged as a red eye by the red eye-gold eye separating section 320. The gold eye converting section 410 may convert a color of the gold eye candidate into a color of a red eye based on a conversion value of a color stored in the ideal red eye-converted value-storage section 420 in accordance with a brightness acquired by the brightness acquiring section 320. Furthermore, the gold eye converting section 410 converts a color of a gold eye separated from a red eye candidate into a color, which is judged as a red eye by the red eye-gold eye separating section 310 based on information received from the red eye-gold eye separating section 310.

The gold eye converting section 410 may convert a color of a gold eye into a color of a red eye based on a conversion value of a color stored in stored in the ideal red eye-converted value-storage section 420 in accordance with a brightness of a gold eye received from the red eye-gold eye separating section 310. The gold eye converting section 410 transmits information regarding a position in image of a gold eye candidate and a gold eye which was converted into a color of red eye, together with a color, to the red eye correcting section 432. The red eye correcting section 432 performs a red eye correcting process to a red eye candidate received from the red eye-gold eye-separating section 310, a red eye received from the gold eye-red eye-separating section 320, together with a gold eye candidate and a gold eye converted into a color of red eye received from the gold eye converting section 410.

Figure 8:
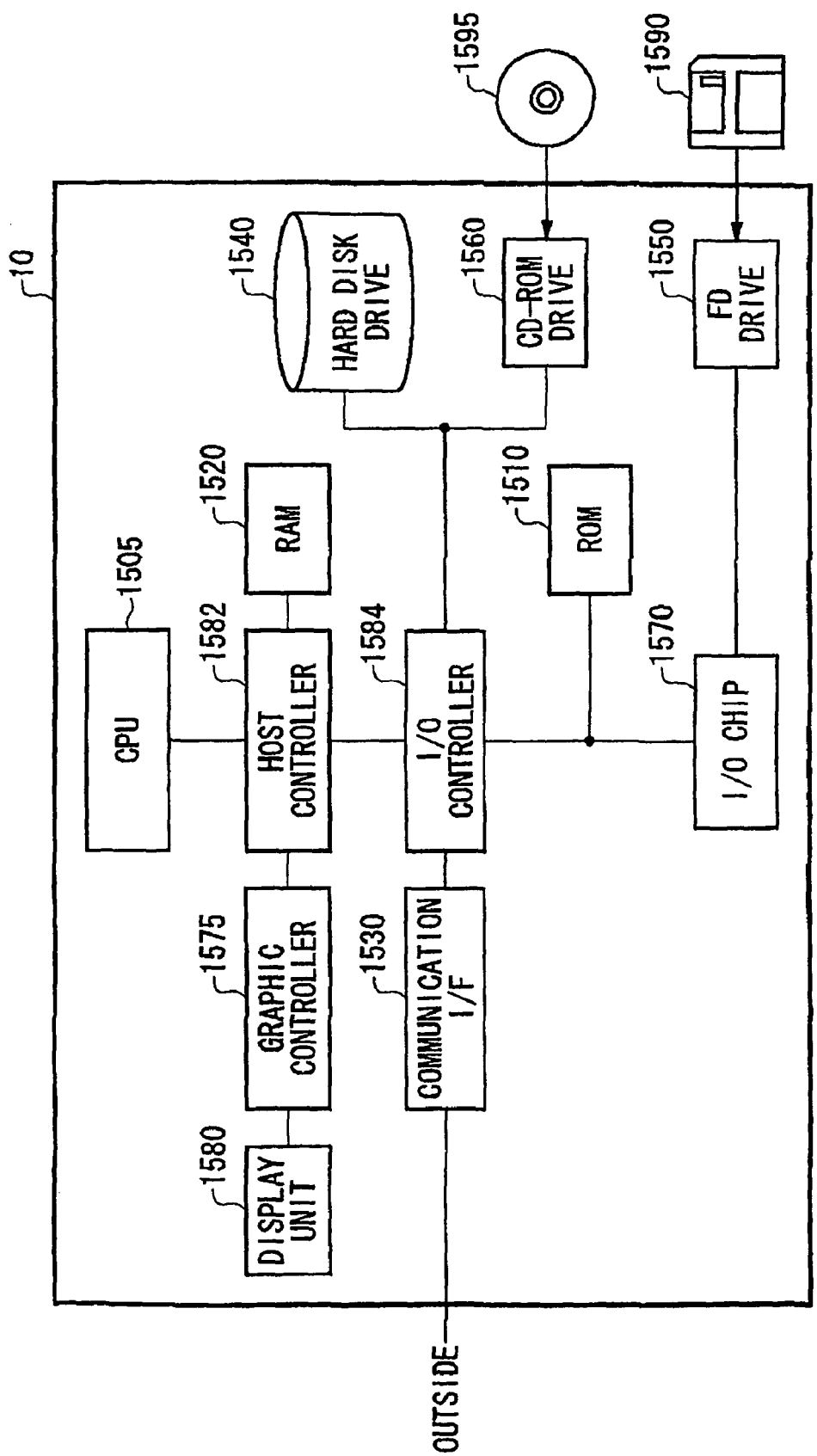
FIG. 8 is a block diagram showing a hardware construction of an image processing apparatus 10.

FIG. 8 shows an example of hardware configuration of the image processing apparatus 10. The image processing apparatus 10 includes a CPU periphery having a CPU 1505, a RAM 1520, a graphic controller 1575 and a display 1580 which are connected through a host controller 1582 each other, an input/output unit having a communication interface 1530, a hard disk drive 1540 and a CD-ROM drive 1560 which are connected to the host controller 1582 through an input/output controller 1584 and a legacy input/output unit having a ROM 1510, a flexible disk drive 1550 and an input/output chip 1570 which are connected to the input/output controller 1584.

The host controller 1582 connects the RAM 1520 to the CPU 1505 and the graphic controller 1575 which access the RAM 1520 with a high transfer ratio. The CPU 1505 operates according to the programs stored in the ROM 1510 and the RAM 1520 to control each unit. The graphic controller 1575 obtains image data generated on a frame buffer provided in the RAM 1520 by the CPU 1505 and displays the same on the display 1580. Alternatively, the graphic controller 1575 may include therein a frame buffer for storing image data generated by the CPU 1505.

The input/output controller 1584 connects the host controller 1582 to the hard disk drive 1540, the communication interface 1530 and the CD-ROM drive 1560 which are relatively high-speed input/output units. A communication interface 1530 communicates other device through network. The hard disk drive 1540 stores the program and data used by the CPU 1505 in the monitoring apparatus 10. The CD-ROM drive 1560 reads the program or data from the CD-ROM 1595 and provides the same to the hard disk drive 1540 through the RAM 1520.

The ROM 1510, and the flexible disk drive 1550 and input/output chip 1570 which are relatively low-speed input/output units are connected to the input/output controller 1584. The ROM 1510 stores a boot program executed by the monitoring apparatus 110 at activating and a program depending on the hardware of the image processing apparatus. The flexible disk drive 1550 reads the programs or data from a flexible disk 1590 and provides the same to the hard disk drive 1540 and the communication interface 1530 through the RAM 1520. The input/output chip 1570 connects various input/output units through the flexible disk drive 1550 and such as a parallel port, a serial port, a keyboard port and a mouse port.

An image processing program stored on a computer readable medium provided to the hard disk drive 1540 through RAM 1520 is stored in a recording medium, such as the flexible disk 1590, the CD-ROM 1595, or an IC card and provided by the user. The image processing program is read from the recording medium, installed into the hard disk drive 1540 in the image processing apparatus 10 through RAM 1520, and executed by the CPU 1505. The image processing program installed into the image processing apparatus 10 and executed by the CPU 1505 causes the image processing apparatus 10 to function as the image inputting section 100, the red eye candidate detecting section 110, the red eye-gold eye separating section 120, the red eye-gold eye separating section 120, the red eye correcting section 130, the gold eye converting section 140, the brightness acquiring section 150, the ideal red eye-converted value-storage section 160, and the outputting section 170.

While the present invention has been described with the embodiment, the technical scope of the invention not limited to the above described embodiment. It is apparent to person skilled in the art that various alternations and improvements can be added to the above-described embodiment. It is apparent from the scope of the claims that the embodiment added such alternation or improvements can be included in the technical scope of the invention.

The invention claimed is:

1. An image processing apparatus comprising:
a red eye candidate detecting section that detects a red eye candidate, which is an area of a color included in a predetermined color range of a red color, from image by using a detecting threshold value differentiating a red eye from a gold eye;
a gold eye candidate detecting section that detects a gold eye candidate, which is an area of a color included in a predetermined color range of a gold color that is not overlapped with the predetermined color range of a red color, from image by using the detecting threshold value;
a red eye-gold eye-correcting section that performs a predetermined red eye correcting process to the red eye candidate detected by the red eye candidate detecting section, and performs a predetermined gold eye correcting process, which is different from the predetermined red eye correcting process, to the gold eye candidate detected by the gold eye candidate detecting section; and
a red eye-gold eye-separating section that judges whether the red eye candidate detected by the red eye candidate detecting section is a predetermined red eye or a predetermined gold eye by using a red eye separating threshold value of which level of R component is higher than a level of R component of the detecting threshold value; and
a gold eye converting section that converts a color of the red eye candidate, which was judged by the red eye-gold eye-separating section as a gold eye, into a color, which is judged by the red eye-gold eye-separating section as a red eye, wherein the red eye-gold eye-correcting section performs the red eye correcting process to a red eye candidate of which color was converted by the gold eye converting section.

2. The image processing apparatus as set forth in claim 1, wherein the level of R component in proportion to levels of G component and B component of the color range of the predetermined red color is higher than a level of R component of the color range of the predetermined gold color.

3. The image processing apparatus as set forth in claim 1, wherein average values of levels of R component, G component, and B component of the color range of the predetermined gold color is larger than levels of the R component, G component and B component of the color range of the predetermined red color.

4. The image processing apparatus as set forth in claim 1, wherein the red eye correcting section equally performs the red eye correcting process to the red eye candidate that was judged as the red eye by the red eye-gold eye separating section, and the red eye candidate of which color was converted by the gold eye converting section since the red eye candidate was judged as the gold eye by the red eye-gold eye separating section.

5. The image processing apparatus as set forth in claim 1, wherein the image processing apparatus further comprising the red eye-gold eye-separating section that judges whether the red eye candidate detected by the red eye candidate detecting section is the predetermined red eye or the predetermined gold eye by using the gold eye separating threshold value which is higher than the level of G component or an average value of levels of R component, G component, and B component of the detecting threshold value; and the gold eye converting section that converts a color of the red eye candidate, which was judged by the red eye-gold eye-separating section as the gold eye, into a color, which is judged as the red eye by the red eye-gold eye-separating section, and the red eye-gold eye-correcting section performs the red eye correcting process to the red eye candidate of which color was converted by the gold eye converting section.

6. The image processing apparatus as set forth in claim 5, wherein the red eye correcting section equally perform the red eye correction to the red eye candidate that was judged as the red eye by the red eye-gold eye separating section, and the red eye candidate of which color was converted by the gold eye converting section since the red eye candidate was judged as the gold eye by the red eye-gold eye separating section.

7. The image processing apparatus as set forth in claim 5, further comprising:
an ideal red eye-converted value-storage section that stores a conversion value of a color in accordance with a brightness of the gold eye candidate which was judged as a gold eye by the red eye-gold eye separating section or the gold eye-red eye-separating section; and a brightness acquiring section that acquires a brightness of the gold eye candidate which was judged as a gold eye by the red eye-gold eye separating section, wherein said gold eye converting section converts the color of the red eye candidate, which was judged as a gold eye by the red eye-gold eye separating section, into a color, which is judged as the red eye by the red eye-gold eye separating section by use of the conversion value of a color stored in the ideal red eye-converted value-storage section in accordance with the brightness acquired by a brightness acquiring section.

8. An image processing method comprising:

a step of detecting a red eye candidate that detecting the red eye candidate, which is an area of a color included in a color range of a predetermined red color, from image by using a detecting threshold value differentiating a red eye from a gold eye;

a step of detecting a gold eye candidate that detects the gold eye candidate, which is an area of a color included in a color range of a predetermined gold color that is not overlapped with a color range of the predetermined red color, from image by using the detecting threshold value;

a step of performing a red eye correction and a gold eye correction that performs a predetermined red eye correcting process to the red eye candidate detected by the red eye candidate detecting step, and performs a predetermined gold eye correcting process, which is different from a predetermined red eye correcting process, to the gold eye candidate detected by the gold eye candidate detecting step;

a step of performing red eye-gold eye-separating to judge whether the red eye candidate detected by the red eye candidate detecting step is a predetermined red eye or a predetermined gold eye by using a red eye separating threshold value of which level of R component is higher than a level of R component of the detecting threshold value; and a step of performing gold eye conversion to convert a color of the red eye candidate, which was judged by the red eye-gold eye-separating step as a gold eye, into a color, which is judged by the red eye-gold eye-separating step as a red eye, wherein the red eye-gold eye-correcting performs the red eye correcting process to a red eye candidate of which color was converted by the gold eye conversion.

9. A non-transitory computer readable medium storing thereon an image processing program for an image processing apparatus, which performs a red correcting process to a red candidate included in image, and performs a gold eye correcting process to a gold eye candidate included in image, the image processing program allowing the image processing apparatus to functions as:

a red eye candidate detecting section that detects the red eye candidate, which is an area of a color included in a color range of a predetermined red color, from image by using a detecting threshold value differentiating a red eye from a gold eye;

a gold eye candidate detecting section that detects a gold eye, which is an area of a color included in a color range of a predetermined gold color that is not overlapped with a color range of the predetermined red color, from image by using the detecting threshold value;

a red eye-gold eye-correcting section that performs the predetermined red eye correcting process to a red eye candidate detected by the red eye candidate detecting section, and performs the predetermined gold eye correcting process, which is different from the predetermined red eye correcting process, to the gold eye candidate detected by the gold eye candidate detecting section;

a red eye-gold eye-separating section that judges whether the red eye candidate detected by the red eye candidate detecting section is a predetermined red eye or a predetermined gold eye by using a red eye separating threshold value of which level of R component is higher than a level of R component of the detecting threshold value; and a gold eye converting section that converts a color of the red eye candidate, which was judged by the red eye-gold eye-separating section as a gold eye, into a color, which is judged by the red eye-gold eye-separating section as a red eye, wherein the red eye-gold eye-correcting section performs the red eye correcting process to a red eye candidate of which color was converted by the gold eye converting section.

* * * * *